United States Patent
Lin et al.

(10) Patent No.: US 9,654,359 B2
(45) Date of Patent: May 16, 2017

(54) METHOD FOR SWITCHING OF A DEVICE, M2M PLATFORM AND NETWORK SYSTEM

(71) Applicant: Huawei Technologies Co., Ltd., Shenzhen, Guangdong (CN)

(72) Inventors: Qi Lin, Shenzhen (CN); Yongjing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 14/335,316

(22) Filed: Jul. 18, 2014

(65) Prior Publication Data

US 2014/0351403 A1    Nov. 27, 2014

Related U.S. Application Data

(63) Continuation of application No. PCT/CN2012/078526, filed on Jul. 12, 2012.

(30) Foreign Application Priority Data

Jan. 19, 2012    (CN) .......................... 2012 1 0018032

(51) Int. Cl.
*G06F 15/173* (2006.01)
*H04L 12/24* (2006.01)
(Continued)

(52) U.S. Cl.
CPC .......... *H04L 41/5077* (2013.01); *H04L 67/12* (2013.01); *H04L 67/16* (2013.01); *H04W 8/06* (2013.01); *H04W 4/005* (2013.01)

(58) Field of Classification Search
CPC ..... H04L 41/5077; H04L 67/12; H04L 67/16; H04W 8/06; H04W 4/005
(Continued)

(56) References Cited

U.S. PATENT DOCUMENTS

| | | |
|---|---|---|
| 2009/0104891 A1 | 4/2009 | Shu et al. |
| 2010/0304716 A1 | 12/2010 | Hoeksel et al. |
| 2011/0191835 A1 | 8/2011 | Hawkes et al. |

FOREIGN PATENT DOCUMENTS

| | | |
|---|---|---|
| CN | 101094061 A | 12/2007 |
| CN | 102281334 A | 12/2011 |
| EP | 2574093 A1 | 3/2013 |

OTHER PUBLICATIONS

"Corrections and Clarifications in Security text," Change Request M2M(12)18_003r2, TS 102690, Version 1.1.2, pp. 1-32, European Telecommunications Standards Institute, Valbonne, France (Jan. 9, 2012).

(Continued)

*Primary Examiner* — Wing F Chan
*Assistant Examiner* — Joseph Maniwang
(74) *Attorney, Agent, or Firm* — Leydig, Voit & Mayer, Ltd.

(57) ABSTRACT

Embodiments of the present invention disclose a method for switching of a device, an M2M platform and a network system. The method includes: a machine-to-machine M2M platform receives a re-registration message including a position of a device in a network service capability layer NSCL resource tree before registration and a position of the device in the resource tree of the NSCL after registration; the M2M platform generates mapping relationship between the position of the device in the resource tree of the NSCL before registration and the position of the device in the resource tree of the NSCL after registration. By way of the present invention, the problem in the prior art can be solved in a manner of re-registration.

21 Claims, 10 Drawing Sheets

(51) Int. Cl.
*H04L 29/08* (2006.01)
*H04W 8/06* (2009.01)
*H04W 4/00* (2009.01)

(58) Field of Classification Search
USPC ........................................................ 709/223
See application file for complete search history.

(56) References Cited

OTHER PUBLICATIONS

"[Stage 2] SCL retargeting alignment with stage 3," Change Request M2M(12)18_026r1, TS 102690, Version 2.0.0, pp. 1-21, European Telecommunications Standards Institute, Valbonne, France (Jan. 17, 2012).

"Technical Specification; Machine-to-Machine communications (M2M); Functional architecture," ETSI TS 102 690, V1.1.2, pp. 1-283, European Telecommunications Standards Institute, Sophia Antipolis, France (Dec. 2011).

METHOD FOR SWITCHING OF A DEVICE, M2M PLATFORM AND NETWORK SYSTEM

CROSS-REFERENCE TO RELATED APPLICATIONS

This application is a continuation of International Patent Application No. PCT/CN2012/078526, filed on Jul. 12, 2012, which claims priority to Chinese Patent Application No. 201210018032.5, filed on Jan. 19, 2012, both of which are incorporated herein by reference in their entireties.

TECHNICAL FIELD

The present invention relates to the field of intercommunication, and more particularly, to a method for switching of a device, an M2M platform and a network system.

BACKGROUND

Scenarios for device attachment defined in the current ETSI M2M standards include:

A set of service capabilities (Service Capabilities, SCs), which is also called a service capability layer (Service Capability Layer, SCL), and is an M2M capability middleware.

An M2M device without SCL capability, i.e., a Ds device, where the Ds device cannot directly communicate with an M2M platform but only can communicate with the M2M platform via a gateway device.

An M2M device with SCL capability, i.e., a D device, where the D device can directly communicate with the M2M platform.

G gateway: M2M gateway device, which directly manages the Ds device, and can directly communicate with the M2M platform.

Gs gateway: M2M gateway device, which can simultaneously manage the Ds device and the D device, and can directly communicate with the M2M platform.

DA: a device application, which is stored in the D device and the Ds device.

GA: a gateway application, which is stored in a G device and a Gs device.

A network application (Network Application, NA), which can be independent of the M2M platform and configured on other server. The server where the NA is located is called a network application server in the subsequent description.

Resources of the M2M platform are managed in a tree-like manner. The M2M platform manages resources corresponding to multiple devices, and the whole resource tree strictly corresponds to a network topology structure of all devices in the current network. For example, catalog DSCL1 under catalog scls indicates resources corresponding to a D device, while the catalog GSCL1 corresponds to resources of a G gateway. Generally, a typical device resource can be represented by a URI as follows:

http://m2m.myoperator.org/sclBaseN1/scls/DSCL1/applications/DA1/accessRights/ar1/permissions In a current device attachment scenario, there may be two kinds of scenarios where the device attachment changes, in view of saving subscriber's communication cost or improving communication quality of signals: scenario 1: the D device switch to Ds device or the Ds device switch to D device; scenario 2: the D device or the Ds device roams between different gateways, or the D device roams between the platform and the gateway (namely, the D device attaches to the platform via the gateway instead of directly attaches to the platform). As for scenario 1, capability of the device itself changes, the D device turns off its SCL capability, and then switches to a DS device, vice versa; as for scenario 2, capability of the device itself doesn't change, and an only difference is the attach point the device uses.

As for the above two scenarios where attachment changes, normally, the device needs to be de-registered first in the system using a de-registration process provided by the ETSI standard, and then registered in the system using a registration process provided by the ETSI standard, and after that the changing of the device attachment can be completed. However, such processing has a problem that a network topology structure may change after the device attaches, which will cause the change of the position of the device in the resource tree, therefore the network application server cannot accurately access resources of the re-registered device.

SUMMARY

Embodiments of the present invention provide a method for switching of a device, an M2M platform and a network system. The problem in the prior art that a network application server cannot accurately access resources of the re-registered device in a manner of re-registration can be solved.

Accordingly, in one aspect, embodiments of the present invention provide a method for switching of a device, including:

receiving, by a machine-to-machine M2M platform, a re-registration message including a position of a device in a resource tree of a network service capability layer, NSCL before registration and a position of the device in the resource tree of the NSCL after registration;

generating, by the M2M platform, mapping relationship between the position of the device in the resource tree of the NSCL before registration and the position of the device in the resource tree of the NSCL after registration.

Particularly, the re-registration message further includes the network address of the device after registration, the method further includes: updating, by the M2M platform, a network address of the device in a domain name system DNS server according to the network address of the device after registration in the re-registration message, so that the network application server makes a request to the DNS server to receive the network address of the device after registration; accessing, by the network application server, the device according to the received network address of the device after registration.

Before the M2M platform receives the re-registration message, the method further includes:

receiving, by the NSCL, a device triggering message sent by the device, where the device triggering message includes an identity of the device, an identity of the NSCL which the device belongs to before registration, or further includes a network address of the device after registration; constructing, by the NSCL, a re-registration message according to the device triggering message, and sending the re-registration message to the M2M platform.

Further, the method further includes:

determining, by the M2M platform, according to the position of the device in the resource tree of the NSCL after registration, that the device does not have SCL capability after registration, and determining according to the position of the device in the resource tree of the NSCL before registration that the device has the SCL capability before registration, notifying the device of setting an SCL capability state of the device to be OFF, and deleting a resource related to the device; or determining, by the M2M platform, according to the position of the device in the resource tree of the NSCL after registration, that the device has the SCL capability after registration, and determining, according to the position of the device in the resource tree of the NSCL before registration, that the device does not have the SCL capability before registration, notifying the device of setting the SCL capability state of the device to be ON, and adding the resource related to the device in the resource tree of the NSCL.

Or, the method further includes:

determining, by the M2M platform, according to the position of the device in the resource tree of the NSCL after registration, a target gateway where the device is located after registration, and determining, according to the position of the device in the resource tree of the NSCL before registration, a source gateway where the device is located before registration, notifying a source gateway SCL of the device of performing de-registration, so that the source gateway deletes the resource related to the device;

notifying, by the M2M platform, a target gateway SCL of the device of creating the resource related to the device according to relevant service data of the device.

Further, the method further includes:

receiving, by the M2M platform, a resource accessing request sent by the network application server, where the resource accessing request includes information on the position of the device in the resource tree of the NSCL before registration;

inquiring, by the M2M platform, the mapping relationship to obtain the position of the device in the resource tree of the NSCL after registration corresponding to the position of the device in the resource tree of the NSCL before registration, and sending a redirection message to the network application server, so that the network application server accesses the M2M platform according to information on the position of the device in the resource tree of the NSCL after registration.

In another aspect, embodiments of the present invention further provide another method for switching of a device, including:

receiving, by an NSCL module, a device triggering message sent by a device in an M2M system, where the device triggering message includes an identity of the device and an identity of an NSCL which the device belongs to before registration;

constructing, by the NSCL module, a re-registration message according to the device triggering message, and sending the re-registration message to an M2M platform, where the re-registration message includes a position of the device in a resource tree of an NSCL before registration and a position of the device in the resource tree of the NSCL after registration, so that the M2M platform generates mapping relationship between the position of the device in the resource tree of the NSCL before registration and the position of the device in the resource tree of the NSCL after registration.

Particularly, the device triggering message further includes a network address of the device after registration and the re-registration message further includes the network address of the device after registration, so that the M2M platform updates a network address of the device in a DNS server according to the network address of the device after registration in the re-registration message.

Further, the method further includes:

when the M2M platform determines, according to the position of the device in the resource tree of the NSCL after registration, that the device does not have SCL capability after registration, and determines, according to the position of the device in the resource tree of the NSCL before registration, that the device has the SCL capability before registration, receiving, by the NSCL module, an OFF notification sent by the M2M platform, setting a device SCL capability state of the device to be OFF according to the OFF notification, and deleting a resource related to the device; or when the M2M platform determines, according to the position of the device in the resource tree of the NSCL after registration, that the device has the SCL capability after registration and determines, according to the position of the device in the resource tree of the NSCL before registration, that the device does not have the SCL capability before registration, receiving, by the device, an ON notification sent by the M2M platform, and setting the device SCL capability state of the device to be ON according to the ON notification.

Or, the method further includes:

when the M2M platform determines, according to the position of the device in the resource tree of the NSCL after registration, a target gateway where the device is attached after registration, and determines, according to the position of the device in the resource tree of the NSCL before registration, a source gateway where the device is located before registration, receiving, by a gateway SCL on the source gateway, a de-registration notification sent by the M2M platform, and performing de-registration to the source gateway SCL of the device according to the de-registration notification, so that the source gateway deletes a resource related to the device;

receiving, by a gateway SCL on the target gateway, a creation notification sent by the M2M platform, and creating the resource related to the device according to the creation notification.

In another aspect, embodiments of the present invention further provide a method for accessing a resource, including:

receiving, by an M2M platform, a resource accessing request from a network application server, where the resource accessing request includes information on a position of a device in a resource tree of an NSCL;

according to mapping relationship of the device in the M2M platform, determining that the position of the device in the resource tree of the NSCL is a position of the device in the resource tree of the NSCL before registration and acquiring a position of the device in the resource tree of the NSCL after registration corresponding to the position of the device in the resource tree of the NSCL before registration; and sending a redirection message to the network application server, so that the network application server accesses the M2M platform according to information on the position of the device in the resource tree of the NSCL after registration included in the redirection message.

The method further includes:

receiving, by the M2M platform, a re-registration message including a position of a device in a resource tree of a network service capability layer, NSCL before registration and a position of the device in the resource tree of the NSCL after registration; generating, by the M2M platform, mapping relationship between the position of the device in the resource tree of the NSCL before registration and the position of the device in the resource tree of the NSCL after registration.

The method further includes:

determining, by the M2M platform, according to the position of the device in the resource tree of the NSCL after registration, that the device does not have SCL capability after registration, and determining, according to the position of the device in the resource tree of the NSCL before registration, that the device has the SCL capability before registration, notifying the device of setting an SCL capability state of the device to be OFF, and deleting a resource related to the device; or determining, by the M2M platform, according to the position of the device in the resource tree of the NSCL after registration, that the device has the SCL capability after registration, and determining, according to the position of the device in the resource tree of the NSCL before registration, that the device does not have the SCL capability before registration, notifying the device of setting the SCL capability state of the device to be ON, and adding the resource related to the device in the resource tree of the NSCL.

Or, the method further includes:

determining, by the M2M platform, according to the position of the device in the resource tree of the NSCL after registration, a target gateway where the device is located after registration, and determining, according to the position of the device in the resource tree of the NSCL before registration, a source gateway where the device is located before registration, notifying a source gateway SCL of the device of performing de-registration, so that the source gateway deletes a resource related to the device;

notifying, by the M2M platform, a target gateway SCL of the device of creating the resource related to the device according to relevant service data of the device.

In another aspect, embodiments of the present invention further provide an M2M platform, including:

a message acquisition unit, configured to receive a re-registration message including a position of the device in a resource tree of an NSCL before registration and a position of the device in the resource tree of the NSCL after registration;

a mapping relationship generation unit, configured to generate mapping relationship between the position of the device in the resource tree of the NSCL before registration and the position of the device in the resource tree of the NSCL after registration.

Particularly, the re-registration message further includes a network address of the device after registration, the M2M platform further includes an address updating unit, configured to update, according to the network address of the device after registration in the re-registration message, a network address of the device in a DNS server, so that the network application server makes a request to the DNS server to receive the network address of the device after registration.

The M2M platform further includes:

a state-switch notifying unit, configured to determine, according to the position of the device in the resource tree of the NSCL after registration, that the device does not have SCL capability after registration, and determine, according to the position of the device in the resource tree of the NSCL before registration, that the device has the SCL capability before registration, notify the device of setting a device SCL capability state of the device to be OFF, and delete a resource related to the device; or determine, according to the position of the device in the resource tree of the NSCL after registration, that the device has the SCL capability after registration, and determine, according to the position of the device in the resource tree of the NSCL before registration, that the device does not have the SCL capability before registration, notify the device of setting a device SCL capability state of the device to be ON, and add a resource related to the device in the resource tree of the NSCL.

The M2M platform further includes:

a de-registration creation notifying unit, configured to determine, according to the position of the device in the resource tree of the NSCL after registration, a target gateway where the device is located after registration, and determine, according to the position of the device in the resource tree of the NSCL before registration, a source gateway where the device is located before registration, notify a source gateway SCL of performing de-registration, so that the source gateway deletes a resource related to the device, and notify a target gateway SCL of the device of creating the resource related to the device according to relevant service data of the device.

The M2M platform further includes:

a request receiving unit, configured to receive a resource accessing request sent by the network application server, where the resource accessing request includes information on the position of the device in the resource tree of the NSCL before registration;

an inquiring unit, configured to inquire the mapping relationship of the device according to the resource accessing request;

a redirecting unit, configured to send a redirection message to the network application server according to the inquired position of the device in the resource tree of the NSCL after registration corresponding to the position of the device in the resource tree of the NSCL before registration, so that the network application server accesses the M2M platform according to information on the position of the device in the resource tree of the NSCL after registration.

In another aspect, embodiments of the present invention further provide another M2M platform, including:

a request receiving unit, configured to receive a resource accessing request of a network application server, where the resource accessing request includes information on a position of a device in a resource tree of an NSCL;

a redirection position acquisition unit, configured to, according to stored mapping relationship of the device, determine that the position of the device in the resource tree of the NSCL is a position of the device in the resource tree of the NSCL before registration and acquire a position of the device in the resource tree of the NSCL after registration corresponding to the position of the device in the resource tree of the NSCL before registration; and a redirection sending unit, configured to send a redirection message to the network application server, so that the network application server accesses the M2M platform according to information on the position of the device in the resource tree of the NSCL after registration.

The M2M platform further includes:

a message acquisition unit, configured to receive a re-registration message including the position of the device in the resource tree of the network service capability layer NSCL before registration and the position of the device in the resource tree of the NSCL after registration;

a mapping relationship generation unit, configured to generate mapping relationship between the position of the device in the resource tree of the NSCL before registration and the position of the device in the resource tree of the NSCL after registration.

The M2M platform further includes:

a state-switch notifying unit, configured to determine, according to the position of the device in the resource tree of the NSCL after registration, that the device does not have SCL capability after registration, and determine, according to the position of the device in the resource tree of the NSCL before registration, that the device has the SCL capability before registration, notify the device of setting an SCL capability state of the device to be OFF, and delete a resource related to the device; or determine, according to the position of the device in the resource tree of the NSCL after registration, that the device has the SCL capability after registration, and determine, according to the position of the device in the resource tree of the NSCL before registration, that the device does not have the SCL capability before registration, notify the device of setting the SCL capability state of the device to be ON, and add the resource related to the device in the resource tree of the NSCL.

Or, the M2M platform further includes:

a de-registration creation notifying unit, configured to determine, according to the position of the device in the resource tree of the NSCL after registration, a target gateway where the device is located after registration, and determine, according to the position of the device in the resource tree of the NSCL before registration, a source gateway where the device is located before registration, notify a source gateway SCL of the device of performing de-registration, so that the source gateway deletes a resource related to the device and notify the target gateway SCL of the device of creating the resource related to the device according to relevant service data of the device.

In another aspect, embodiments of the present invention further provide an NSCL device, including:

a triggering message receiving module, configured to receive a device triggering message sent by a device in an M2M system, where the device triggering message includes an identity of the device and an identity of an NSCL which the device belongs to before registration;

a re-registration message construction module, configured to construct, according to the device triggering message, a re-registration message including a position of the device in a resource tree of an NSCL before registration and a position of the device in the resource tree of the NSCL after registration;

a re-registration message sending module, configured to send the re-registration message to an M2M platform, so that the M2M platform generates mapping relationship between the position of the device in the resource tree of the NSCL before registration and the position of the device in the resource tree of the NSCL after registration.

The device triggering message further includes a network address of the device after registration, and the re-registration message further includes the network address of the device after registration, so that the M2M platform updates a network address of the device in a DNS server according to the network address of the device after registration in the re-registration message.

The NSCL device further includes:

a device resource processing module, configured to receive an OFF notification sent by the M2M platform, set a device SCL capability state of the device to be OFF according to the OFF notification, and delete resources related to the device; or receive an ON notification sent by the M2M platform, and set the device SCL capability state of the device to be ON, and add resources related to the device in the resource tree of the NSCL.

The NSCL device further includes:

a gateway resource processing module, configured to receive a de-registration notification sent by the M2M platform, perform de-registration to a source gateway SCL of the device according to the de-registration notification, so that the source gateway deletes resources related to the device; or receive a creation notification sent by the M2M platform, and create resources related to the device according to the creation notification.

In a final aspect, embodiments of the present invention further provide a network system, including:

an NSCL device, configured to receive a device triggering message sent by a device in an M2M system, construct a re-registration message according to the device triggering message, and send the re-registration message to an M2M platform, where the device triggering message includes an identity of the device and an identity of an SCL which the device belongs to before registration;

the M2M platform, configured to receive the re-registration message, where the re-registration message includes a position of the device in a resource tree of an NSCL before registration and a position of the device in the resource tree of the NSCL after registration; and generate mapping relationship between the position of the device in the resource tree of the NSCL before registration and the position of the device in the resource tree of the NSCL after registration.

Further, the system further includes a network application server, configured to send a resource accessing request to the M2M platform, where the resource accessing request includes information on the position of the device in the resource tree of the NSCL before registration; and receive a redirection message returned by the M2M platform;

The M2M platform is further configured to inquire, according to the received resource accessing request, the mapping relationship to obtain a position of the device in the resource tree of the NSCL after registration corresponding to the position of the device in the resource tree of the NSCL before registration, and send a redirection message to the network application server, so that the network application server accesses the M2M platform according to the on the position of the device in the resource tree of the NSCL after registration.

When the embodiments of the present invention are implemented, by carrying in the re-registration message the position of the device in the resource tree of the network service capability layer NSCL before registration and the position of the device in the resource tree of the NSCL after registration, the M2M platform can establish corresponding relationship between the positions of the device in the resource tree of the NSCL before and after registration, and the network application server can access the device resources according to the position of the device in the resource tree of the NSCL before registration after the device is switched.

BRIEF DESCRIPTION OF DRAWINGS

In order to illustrate the technical solutions in embodiments of the present invention or the prior art more clearly, accompanying drawings needed in the embodiments or the prior art are illustrated briefly as follows. Apparently, the accompanying drawings are merely certain of embodiments of the present invention, and persons skilled in the art can derive other drawings from them without creative efforts.

DESCRIPTION OF EMBODIMENTS

The technical solutions in the embodiments of the present invention are hereinafter described clearly and completely with reference to the accompanying drawings in the embodiments of the present invention. Obviously, the embodiments described here are part of the embodiments of the present invention and not all of the embodiments. All other embodiments obtained by persons skilled in the art on the basis of the embodiments of the present invention without any creative efforts all fall within the scope of the present invention.

Embodiments of the present invention provide a method for switching of a device in an M2M system. In the method, network side information is updated via re-registration, and in a process where a device in the M2M system performs type switching or roaming attachment, system service resources are smoothly transferred, and meanwhile the change of URI (and or IP address) of the device is processed, so that the overall switching process maintains transparent to the network side application program, and M2M service continuity can be kept.

Figure 1:
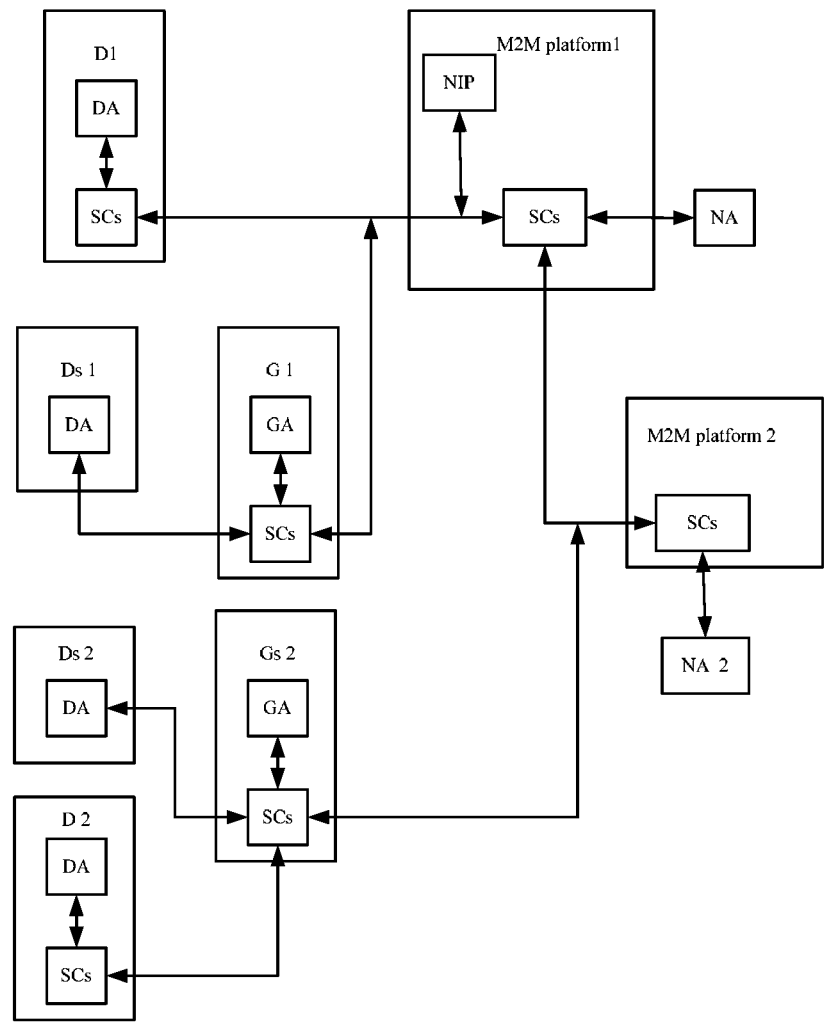
FIG. 1 is a schematic diagram of a device attachment scenario according to an embodiment of the present invention.

FIG. 1 is a schematic diagram of a device attachment scenario according to an embodiment of the present invention. Name definition for each device in the figure is the same as above. There are three types of exemplary attachment situations in this example: 1, device D1 directly attaches to M2M platform 1; 2, device Ds 1 attaches to the M2M platform via gateway G1; 3, device Ds 2 and device D2 both attach to M2M platform 2 via gateway Gs 2.

Figure 2:
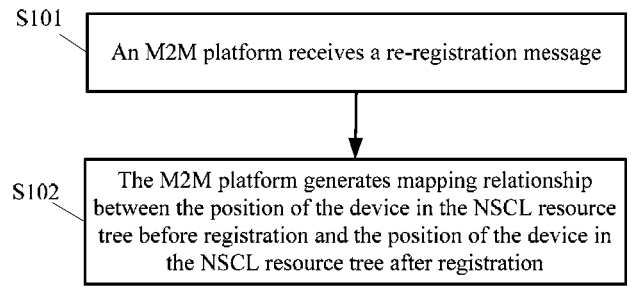
FIG. 2 is a specific flow chart of a method for switching of a device according to an embodiment of the present invention.

FIG. 2 is a specific flow chart of a method for switching of a device according to an embodiment of the present invention, and the method includes the following steps:

S101, An M2M platform receives a re-registration message including a position of a device in a resource tree of a network service capability layer (Network Service Capability Layer, NSCL) before registration and a position of the device in the resource tree of the NSCL after registration. Meanwhile, the re-registration message may further include a network address of the device after registration.

Of course, before this step, the method can further include a process that an NSCL module (either an M2M device with SCL capability or a gateway with SCL capability) constructs and sends the re-registration message according to the device triggering message, including the steps as follows:

A: The NSCL module receives the device triggering message sent by the device, and the device triggering message includes an identity of the device and an identity of an SCL which the device belongs to before registration. When the device is a device with SCL capability, the NSCL module is a NSCL module in the device, a device application (DA) will send the triggering message to the NSCL module; when the device is a device without SCL capability, the NSCL module is a NSCL module in the gateway connected to the device, and the gateway receives the triggering message sent by the device.

That is, with reference to the situations defined in FIG. 1, the NSCL module can be a device SCL provided in the device D, or can be an SCL provided in the gateway G or Gs, depending on the device triggering message, the device and the scenario. Particularly, the device to be switched can be a device D with SCL capability or a device Ds without SCL capability.

B, The NSCL module constructs a re-registration message according to the device triggering message, and sends the re-registration message to the M2M platform. When constructing the re-registration message, the NSCL module determines a position of the device in the resource tree of the NSCL before registration according to the identity of the device included in the device triggering message. Since the identity of the device is unique in the resource tree of the NSCL, and hereby the position of the device in the resource tree of the NSCL before re-registration can be determined. Meanwhile, the NSCL module determines a position of the device in the resource tree of the NSCL after registration according to practical situations.

The re-registration message can achieve switching of a device type according to information contents therein, that is, to switch a device with SCL capability to a device without SCL capability, or to switch a device without SCL capability to a device with SCL capability; or, the re-registration message can achieve roaming of device, for example, to switch the device 1 from gateway 1 to gateway 2, or in the scenario shown in FIG. 1, the device D is switched to attaching to the M2M platform via Gs gateway instead of directly attachment.

Correspondingly, if the device triggering message includes a network address of the device after registration, correspondingly, the re-registration message also can include or not include the network address of the device after registration.

It should be noted that, if the NSCL module is the NSCL module in the gateway, then the NSCL module receiving the device triggering message is not the NSCL module in the gateway of the device before registration, but the NSCL module in a target gateway to which it is desirable to switch.

S102, The M2M platform generates mapping relationship between the position of the device in the resource tree of the NSCL before registration and the position of the device in the resource tree of the NSCL after registration.

Particularly, the position of the device in the resource tree of the NSCL can be identified with a URI, and the mapping relationship can include a URI of the device in the resource tree of the NSCL before registration and an URI of the device in the resource tree of the NSCL after registration. The M2M platform stores the mapping relationship, so that the M2M platform can access a resource corresponding to the URI of the device in the resource tree of the NSCL after registration according to the mapping relationship, after receiving an access request for the URI of the device in the resource tree of the NSCL before registration. Table 1 is a table reflecting mapping relationship between the position of the device in the resource tree of the NSCL before registration and the position of the device in the resource tree of the NSCL after registration.

TABLE 1

| Old Device URI | New Device URI |
| --- | --- |
| http://OldURI1 | http://NewURI1 |
| http://OldURI2 | http://NewURI2 |
| http://OldURI3 | http://NewURI3 |
| . . . | . . . |

Figure 3:
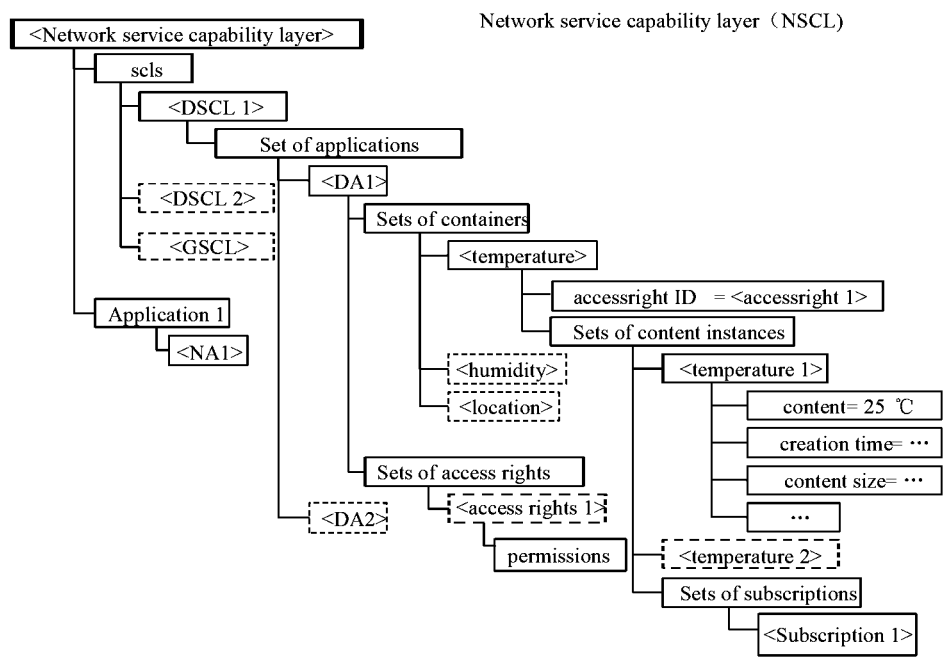
FIG. 3 is a specific schematic diagram of a resource tree of an NSCL of an M2M platform according to an embodiment of the present invention.
Figure 3A:
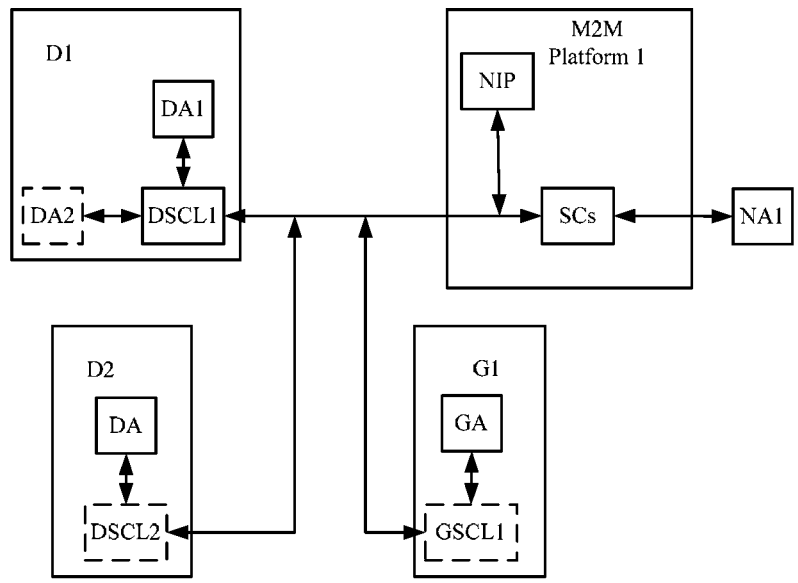
FIG. 3a is a specific schematic diagram of a network topology structure corresponding to the resource tree of the NSCL in FIG. 3 according to an embodiment of the present invention.

Particularly, the URI in the Table 1 above is a URI generated according to the resource tree, for example, the resource tree in FIG. 3, then the resource of a certain device can be represented by the URI as follows:

http://m2m.myoperator.org/sclBaseN1/scls/DSCL1/applications/DA1/accessRights/ar1/permissions FIG. 3 is a specific schematic diagram of a resource tree of an NSCL according to an embodiment of the present invention. The whole resource tree strictly corresponds to a network topology in FIG. 3a. For example, catalog DSCL1 under catalog scls indicates a resource corresponding to a D1 device, while the catalog GSCL1 corresponds to a resource of a G gateway. After the device is re-registered, the position of the device in the resource tree needs to be changed accordingly. For example, if the D1 device switches to the Ds device under the GSCL1, the URI of the device in the resource tree changes to:

The URI of the D device before switching is:
http://m2m.myoperator.org/sclBaseN1/scls/DSCL1
The URI of the Ds device after switching is:
http://m2m.myoperator.org/sclBaseN1/scls/GSCL1/D'

Generally, a network application server doesn't need to directly access the re-registered device in these M2M platforms, then the re-registration message includes a network address of the device after registration; however, if there is a need to support access to these devices by the network application server, then the re-registration message further includes a network address of the device after registration, for example, in a case where an access failure occurs when the network application server uses a cached IP of a URI, or in a case where no cached IP of the device URI is available, the device IP needs to be acquired again via the DNS server to access the device.

If the re-registration message further includes a network address of the device after registration, the M2M platform updates the network address of the device in a domain name system (Domain Name System, DNS) server according to the network address of the device after registration in the re-registration message. In this way, the network application server (also called a network side application) can directly access the device with the correct address, after acquiring from the DNS server the network address of the device after registration. That is, the network application server makes a request to the DNS server to acquire the network address of the device after registration; the network application server accesses the device according to the acquired network address of the device after registration.

As known from the above descriptions, the network application server according to embodiments of the present invention can continue to access the resource of the device with information on the position of the device in the resource tree of the NSCL before registration (such as, URI), so as to ensure service continuity. That is, if the M2M platform receives a resource accessing request of a network application server, where the resource accessing request includes information on the position of the device in the resource tree of the NSCL before registration; the M2M platform acquires its corresponding position of the device in the resource tree of the NSCL after registration according to the position of the device in the resource tree of the NSCL before registration; sends a redirection message to the network application server, so that the network application server can access the M2M platform according to information on the position of the device in the resource tree of the NSCL after registration.

After receiving the redirection message, the network application server can store the information on the position of the device in the resource tree of the NSCL after registration, and updates the information on the position of the device in the resource tree of the NSCL before registration with the information on the position of the device in the resource tree of the NSCL after registration, so as to use in a subsequent access the information on the position of the device in the resource tree of the NSCL after registration to perform access.

Of course, in step S102, the M2M platform also can further update the resource tree of the NSCL in the M2M platform according to the position of the device in the resource tree of the NSCL before registration and the position of the device in the resource tree of the NSCL after registration in the re-registration message, so as to accurately reflect the network topology structure in the resource tree after registration of the device.

In the above embodiment, the problem occurring when a network side application accesses resources is solved in an URI redirection manner, one advantage of doing so is that, URI redirection operation only needs to be done once, then the network application server can persistently access the resources using the URI after registration, and the system has a higher efficiency on the whole.

In other embodiments of the present invention, a manner where the M2M platform directly return resource information to the application program using a mapping process (that is, M2M inquires, according to the mapping relationship shown in Table 1 and an URI before registration carried in the network application server, its corresponding URI after registration, and then acquires the corresponding resource according to the URI after registration) can also be adopted, one advantage of doing so is that, the network application server does not need to perform any processing. Also, a complete URI communication mode between SCL entities adopted by the current URI also needs to be supported. However, considering that the complete URI communication mode has a relatively large communication overhead, in other embodiments of the present invention, communication within the SCL or between the SCL and a restricted device may adopt a simplified URI communication mode (for example, 1—adopting abbreviated representation, such as simplifying http://application to http://app; 2—adopting binary abbreviation, such as simplifying http://application to meaningless svxkdj), and the method of simplifying URI needs to map between a complete URI and an abbreviated URI, increasing internal processing flow of the system.

Based on the above embodiments, the NSCL can be a device SCL in the device or a gateway SCL in the gateway connected to the device, according to a specific scenario.

For example, corresponding to several scenarios in FIG. 1, if the D device switches to a Ds device, then after the above steps, the method also can include:

the M2M platform determines, according to the position of the device in the resource tree of the NSCL after registration, that the device does not have the SCL capability after registration and determines, according to the position of the device in the resource tree of the network service capability layer NSCL before registration, that the device has the SCL capability before registration, notifies the device of setting an SCL capability state of the device to be OFF, and deletes the resource related to the device; or the M2M platform determines, according to the position of the device in the resource tree of the NSCL after registration, that the device has SCL capability after registration, and determines, according to the position of the device in the resource tree of the network service capability layer NSCL before registration, that the device does not have SCL capability before registration, notifies the device of setting the SCL capability state of the device to be ON, and adds the resource related to the device in the resource tree of the NSCL. As can be seen from FIG. 3, a device with SCL capability is under "scls" catalog in the resource tree; in this way, the M2M platform can determine, according to the re-registration message, whether a device without SCL capability is switched to a device with SCL capability, or the other way round.

Or, after the above steps, the method also can include:

the M2M platform determines a target gateway where the device is located after registration according to the position of the device in the resource tree of the NSCL after registration, and determines a source gateway where the device is located before registration according to the position of the device in the resource tree of the NSCL before registration, notifies a source gateway SCL of the device of performing de-registration, so that the source gateway can delete the resource related to the device. The resource is relevant a resource generated when the device registers at the source gateway.

The M2M platform notifies a target gateway SCL of the device of creating the resource related to the device according to relevant service data of the device. The resource is all the resource related to the device, depending on types of the device.

That is, the M2M platform also can determine, according to the positions of the device in the resource tree of the NSCL before and after registration, whether the gateway of the device has changed, if yes, it can confirm that the device has roamed, and determine a source gateway and a target gateway before and after registration; according to information on the determined source gateway and target gateway, the M2M platform confirms network addresses of the two and sends corresponding information to them.

As can be known from the above descriptions, by carrying in the re-registration message the position of the device in the resource tree of the network service capability layer NSCL before registration and the position of the device in the resource tree of the NSCL after registration, the M2M platform can establish corresponding relationship between the positions of the device in the resource tree of the NSCL before and after registration, the network application NA can use the position location before registration to access according to the corresponding relationship, and thus normal services of the user cannot be interrupted for changing of network addresses.

Figure 4:
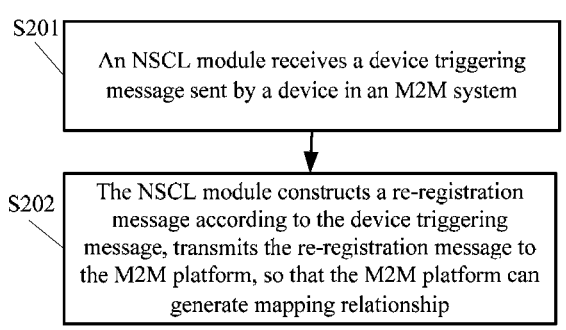
FIG. 4 is another specific flow chart of a method for switching of a device according to an embodiment of the present invention.

Correspondingly, as shown in FIG. 4, embodiments of the present invention also provide a method for switching of a device, including the steps as follows:

S201, An NSCL module receives a device triggering message sent by a device in an M2M system, where the device triggering message includes an identity of the device and an identity of a NSCL which the device belongs to before registration. Where the NSCL module can be a device SCL in the device or a gateway SCL in the gateway connected to the device.

S202, The NSCL module constructs a re-registration message according to the device triggering message, and sends the re-registration message to an M2M platform, where the re-registration message includes a position of the device in a resource tree of the network service capability layer NSCL before registration and a position of the device in the resource tree of the NSCL after registration, so that the M2M platform can generate mapping relationship between the position of the device in the resource tree of the NSCL before registration and the position of the device in the resource tree of the NSCL after registration.

Particularly, in the above step, if the device triggering message further includes a network address of the device after registration, the re-registration message further can include the network address of the device after registration, so that the M2M platform can update a network address of the device in a DNS server according to the network address of the device after registration in the re-registration message.

Corresponding to the embodiment in FIG. 2, according to a specific scenario, for example the device type is switched, the above method also can include the steps as follows:

when the M2M platform determines, according to the position of the device in the resource tree of the NSCL after registration, that the device does not have SCL capability after registration, and determines, according to the position of the device in the resource tree of the NSCL before registration, that the device has SCL capability before registration, the NSCL module receives an OFF notification sent by the M2M platform, sets a device SCL capability state of the device to be OFF according to the OFF notification, and deletes the resource related to the device; or when the M2M platform determines, according to the position of the device in the resource tree of the NSCL after registration, that the device has SCL capability after registration, and determines, according to the position of the device in the resource tree of the NSCL before registration, that the device does not have SCL capability before registration, the device receives an ON notification sent by the M2M platform, sets the device SCL capability state of the device to be ON according to the ON notification, and adds the resource related to the device in the resource tree of the NSCL.

If the device roams, the above method also can include the steps as follows:

when the M2M platform determines, according to the position of the device in the resource tree of the NSCL after registration, a target gateway where the device is located after registration, and determines, according to the position of the device in the resource tree of the NSCL before registration, a source gateway where the device is located before registration, a gateway SCL in the source gateway receives a de-registration notification sent by the M2M platform, performs de-registration to the source gateway SCL of the device according to the de-registration notification, so that the source gateway deletes the resource related to the device. The resource is the resource related to the device, depending on specific types of the device.

A gateway SCL in the target gateway receives a creation notification sent by the M2M platform, and creates the resource related to the device according to the creation notification.

A specific flow of a method for switching of a device according to an embodiment of the present invention is described in the following with reference to the M2M scenario described in FIG. 1, for further describing the present invention.

Figure 5:
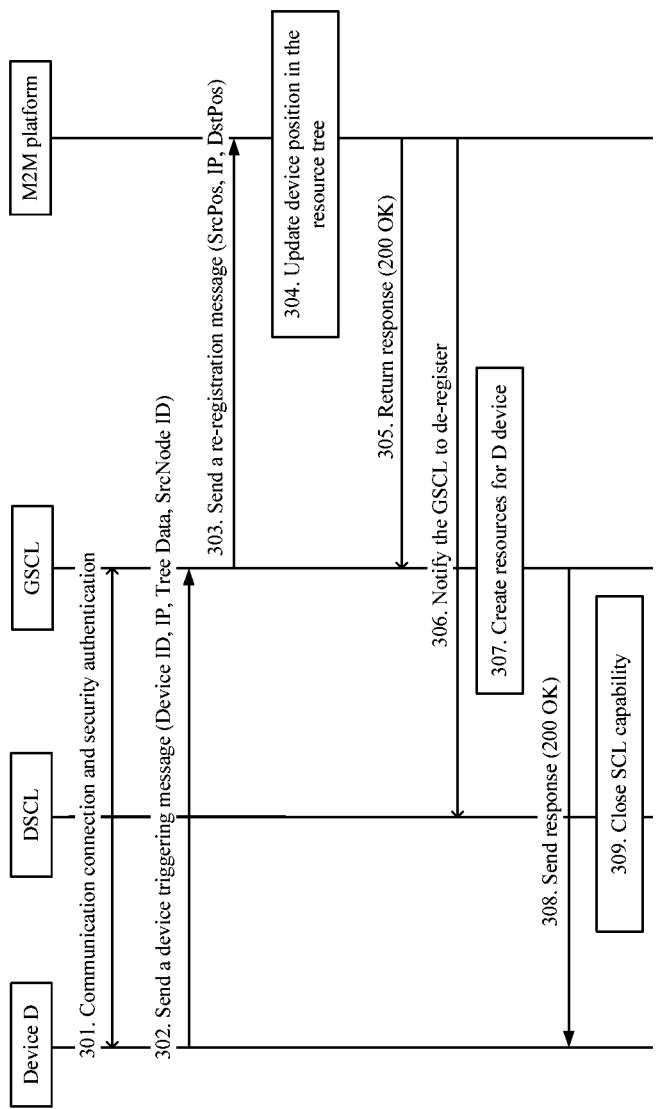
FIG. 5 is a specific flow chart of switching a D device to a Ds device according to an embodiment of the present invention.

FIG. 5 is a situation that a D device switches (or converts) to a Ds device. The flow includes steps as follows:

301, A Ds device and a target gateway SCL (GSCL) perform communication connection and security authentication.

302, The Ds device sends a device triggering message to the target gateway SCL, where the device triggering message can include a device ID (Device ID), an IP address of the device after registration, service data (Tree Data), a source NSCL module ID (SrcNode ID), and etc.

303, The target gateway SCL sends a re-registration message to an M2M platform. The re-registration message can include positions of the device in the resource tree of the NSCL before and after registration (i.e., SrcPos is a URI of D device, DstPos is a URI of Ds device), and an IP address of the device after registration. Particularly, the position of the device before registration can be transferred to the target gateway via a DA in the device, and the position of the device after registration is the position of the device in the target gateway.

304, The M2M platform updates the resource position of the Ds device in the resource tree of the NSCL according to the positions of the Ds device in the resource tree of the NSCL before and after registration, and generates a URI mapping table according to the positions of the device in the resource tree of the NSCL before and after registration, and the mapping table records URIs of the device before and after registration.

305, The M2M platform returns a response to the target gateway SCL.

306, The M2M platform determines that the D device switches to a Ds device, according to the positions of the device in the resource tree of the NSCL before and after registration in the re-registration message, and at this time, the M2M platform notifies a device SCL (DSCL) on the device of performing de-registration.

307~308, The target gateway SCL creates the resource of the D device according to service data parameters sent by the Ds device, and returns a response. Steps 307~308 and step 306 have no inevitable sequential orders.

309, The M2M notifies the DSCL of setting an SCL capability state to be OFF, and deletes the resource of the Ds device related to the DSCL.

310~311, The DSCL closes communication connection with the M2M platform, and at this time, the Ds device switches to the D device.

In this embodiment, the position parameter of the device in the resource tree of the NSCL before registration can be the device ID and the ID of the SLC which the device originally belongs to, the position parameter of the device in the resource tree of the NSCL after conversion can be a device type, because in terms of re-registration flow, the device capability may change or not change, and the position of the device in the resource tree depends on whether the device capability changes.

Similarly, when the M2M platform notifies the SCL, which the device originally belongs to, of de-registration, the parameter used can be a device type, for a device SCL, it needs to turn off its capability, for a device SCL, it only needs to delete the resource related to the Ds. In order to accommodate a more complicated network topology in the future, another solution for the message parameter is that the URI can be directly adopted to indicate actions of the M2M platform and the M2M device.

Figure 6:
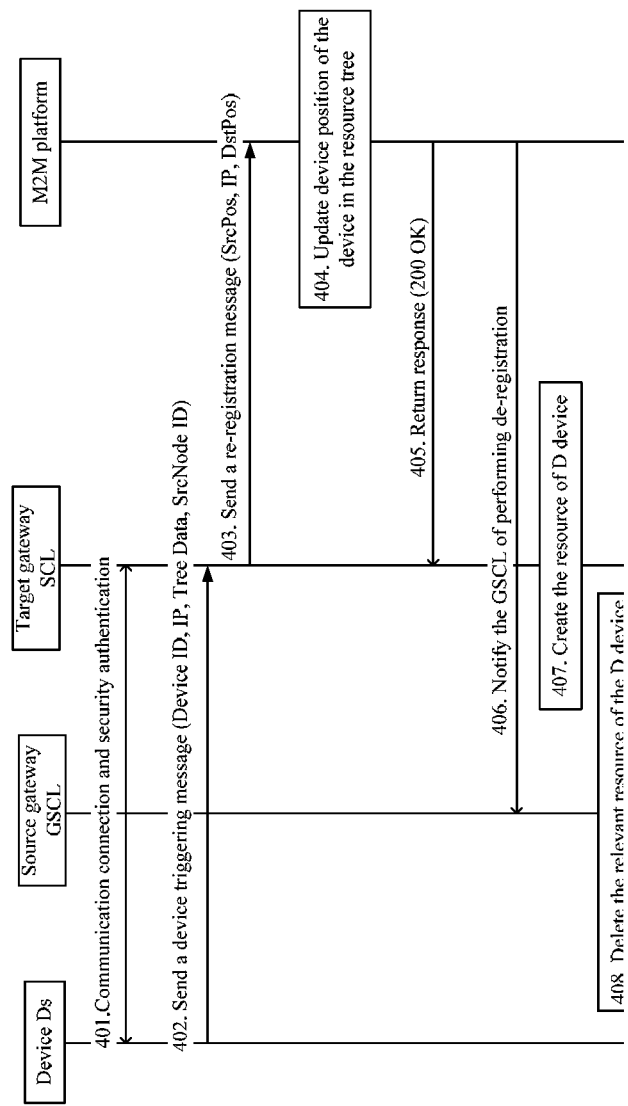
FIG. 6 is a processing flow chart when a Ds device is roaming according to an embodiment of the present invention.

FIG. 6 is a processing flow chart when a Ds device is roaming. The flow includes steps as follows:

401, A Ds device and a target GSCL perform communication connection and security authentication.

402, The Ds device sends a device triggering message to the target GSCL, where the device triggering message can include a device ID (Device ID), an IP address of the device after registration, service data (Tree Data), a source NSCL module ID (SrcNode ID), and etc.

403, The target GSCL sends a re-registration message to an M2M platform, where the re-registration message can include positions of the device in the resource tree of the NSCL before and after registration (i.e., SrcPos is URI of D device, DstPos is URI of Ds device), and an IP address of the device after registration.

404~405, The M2M platform updates the position of the Ds device in the resource tree of the NSCL according to the re-registration message, generates a URI mapping table according to the positions of the Ds device in the resource tree of the NSCL before and after registration, and returns a response. The mapping table records URIs of the device before and after registration.

406, The M2M platform notifies the source GSCL of performing de-registration.

407, The target GSCL creates a relevant resource according to service data parameters sent by the Ds device. This step and step 406 have no inevitable sequential orders.

408, The source GSCL deletes the relevant resource of the Ds device.

409~410, The Ds device closes the communication connection with the source GSCL.

Figure 7:
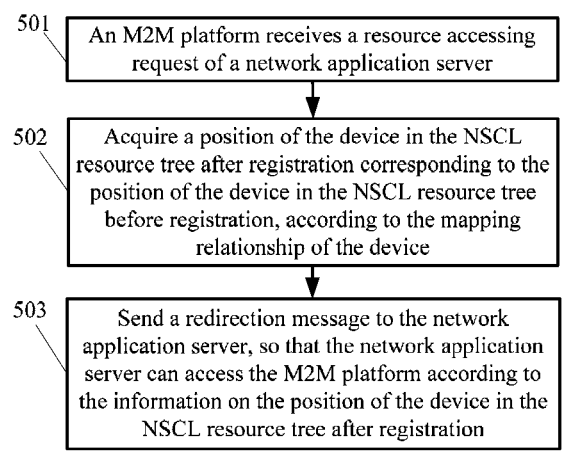
FIG. 7 is a specific flow chart of a method for accessing a resource according to an embodiment of the present invention.

FIG. 7 is a specific flow chart of a method for accessing a resource according to an embodiment of the present invention, and the method includes the following steps:

501, An M2M platform receives a resource accessing request of a network application server, where the resource accessing request includes information on a position of the device in a resource tree of an NSCL;

502, According to mapping relationship of the device in the M2M platform, determine that the position of the device in the resource tree of the NSCL is a position of the device in the resource tree of the NSCL before registration and acquire a position of the device in the resource tree of the NSCL after registration corresponding to the position of the device in the resource tree of the NSCL before registration; and 503, Send a redirection message to the network application server, so that the network application server accesses the M2M platform according to the information on the position of the device in the resource tree of the NSCL after registration in the redirection message.

Particularly, the mapping relationship can be configured to the M2M platform by other server, or can be generated by the M2M platform according to a re-registration message, and the method further includes: the M2M platform receives a re-registration message including the position of the device in the resource tree of the network service capability layer NSCL before registration and the position of the device in the resource tree of the NSCL after registration; the M2M platform generates mapping relationship between the position of the device in the resource tree of the NSCL before registration and the position of the device in the resource tree of the NSCL after registration.

Further, the method further can include:

the M2M platform determines, according to the position of the device in the resource tree of the NSCL after registration, that the device does not have SCL capability after registration, and determines, according to the position of the device in the resource tree of the NSCL before registration, that the device has SCL capability before registration, notifies the device of setting an SCL capability state of the device to be OFF, and deletes a resource related to the device; or the M2M platform determines, according to the position of the device in the resource tree of the NSCL after registration, that the device has SCL capability after registration, and determines, according to the position of the device in the resource tree of the NSCL before registration, that the device does not have SCL capability before registration, notifies the device of setting the SCL capability state of the device to be ON, and adds the resource related to the device to the resource tree of the NSCL.

Or, the method further includes:

the M2M platform determines, according to the position of the device in the resource tree of the NSCL after registration, a target gateway where the device is located after registration, and determines according to the position of the device in the resource tree of the NSCL before registration, a source gateway where the device is located before registration, notifies a source gateway SLC of the device of performing de-registration, so that the source gateway deletes a resource related to the device;

the M2M platform notifies a target gateway SCL of the device to create the resource related to the device according to relevant service data of the device.

Figure 8:
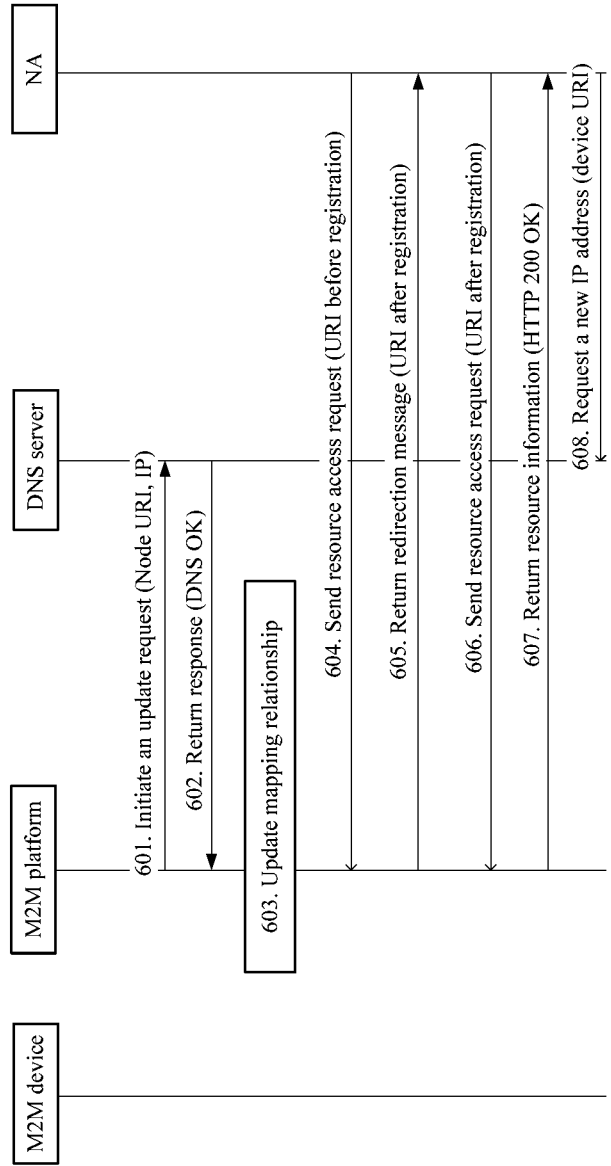
FIG. 8 is a flow chart showing interaction among the M2M platform, a DNS server and a network-side application after the M2M platform performs re-registration of a device according to an embodiment of the present invention.

FIG. 8 is a flow chart showing interaction among the M2M platform, a DNS server and a network-side application after the M2M platform performs re-registration of the devices according to FIG. 5 or FIG. 6. The flow includes steps as follows:

601~602, The M2M platform initiates an update request to a DNS server according to a device IP after registration in the re-registration message, and receives a return response.

603, The M2M platform generates a URI mapping table according to the positions of a device in the resource tree of the NSCL before and after registration in the re-registration message, where the mapping table records URIs of the device before and after registration.

604, A network side application uses the URI of the device before registration to access a resource in the M2M platform.

605, The M2M platform inquires the URI mapping table, and sends a URI redirection message to the network side application, where the URI redirection message includes the URI of the device resource after registration.

606, The network side application uses, the URI of the device after registration, to access the resource in the M2M platform.

607, The M2M platform returns accurate resource information.

608~609, The network side application requests to receive a new IP address of the M2M device resource via the DNS server. Steps 608~609 and steps 604~607 have no inevitable sequential orders.

610~611, The network side application uses an IP address after registration to access the M2M device, and the M2M device returns accurate resource information.

As can be seen from further description of the embodiments, technical solutions disclosed in embodiments of the present invention can support smooth conversion and roaming of the M2M device, save communication cost or improve communication quality and reliability. Meanwhile, during type conversion and roaming of the M2M device, service continuity can be guaranteed, and M2M user experience can be promoted.

Figure 9:
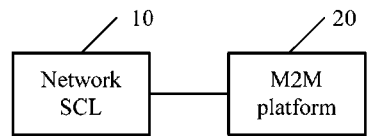
FIG. 9 is a schematic diagram of a specific construction of a network system according to an embodiment of the present invention.

Correspondingly, embodiments of the present invention further provide a network system, as shown in FIG. 9, and the system can include: an NSCL device 10, configured to receive a device triggering message sent by a device in an M2M system, construct a re-registration message according to the device triggering message, and send the re-registration message to an M2M platform 20, where the device triggering message includes an identity of the device and an identity of an SCL which the device belongs to before registration; the M2M platform 20, configured to receive the re-registration message, where the re-registration message includes a position of the device in a resource tree of an NSCL before registration and a position of the device in the resource tree of the NSCL after registration; and generate mapping relationship between the position of the device in the resource tree of the NSCL before registration and the position of the device in the resource tree of the NSCL after registration.

Figure 10:
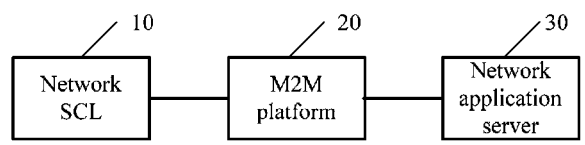
FIG. 10 is a schematic diagram of another specific construction of a network system according to an embodiment of the present invention.

As shown in FIG. 10, the system further includes a network application server 30, configured to send a resource accessing request to the M2M platform 20, where the resource accessing request includes information on the position of the device in the resource tree of the NSCL before registration; and receive a redirection message returned by the M2M platform 20;

The M2M platform 20 is further configured to inquire, according to the received resource accessing request, the mapping relationship to obtain the position of the device in the resource tree of the NSCL after registration corresponding to the position of the device in the resource tree of the NSCL before registration, and send the redirection message to the network application server, so that the network application server 30 accesses the M2M platform 20 according to the information on the position of the device in the resource tree of the NSCL after registration.

Figure 11:
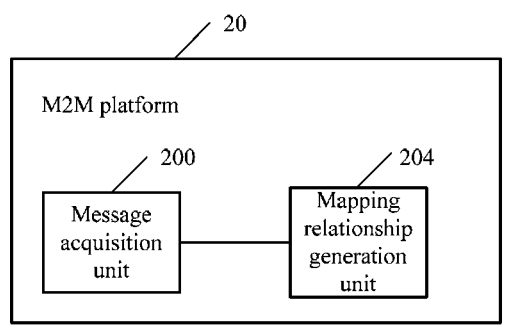
FIG. 11 is a schematic diagram of a first specific construction of the M2M platform according to an embodiment of the present invention.

FIG. 11 is a schematic diagram of a construction of an M2M platform 20, and the platform 20 includes:

a message acquisition unit 200, configured to receive a re-registration message, where the re-registration message includes a position of a device in a resource tree of a network service capability layer NSCL before registration and a position of the device in the resource tree of the NSCL after registration;

a mapping relationship generation unit 204, configured to generate mapping relationship between the position of the device in the resource tree of the NSCL before registration and the position of the device in the resource tree of the NSCL after registration.

Figure 12:
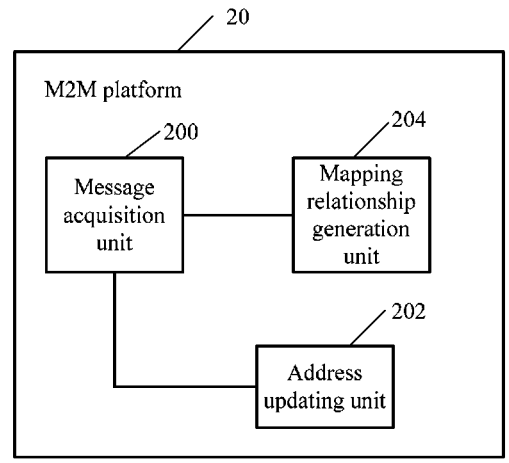
FIG. 12 is a schematic diagram of a second specific construction of the M2M platform according to an embodiment of the present invention.

As shown in FIG. 12, when the re-registration message further includes a network address of the device after registration, the M2M platform further includes an address updating unit 202, configured to update a network address of the device in a domain name system DNS server according to the network address of the device after registration in the re-registration message, so that the network application server makes a request to the DNS server to receive the network address of the device after registration.

Figure 13:
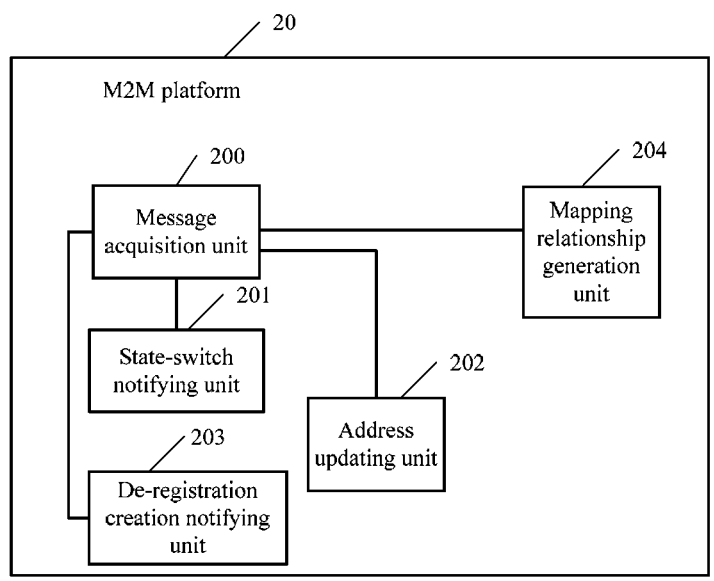
FIG. 13 is a schematic diagram of a third specific construction of the M2M platform according to an embodiment of the present invention.

As shown in FIG. 13, the platform 20 also can include one or more units of the following units:

A state-switch notifying unit 201, configured to determine, according to the position of the device in the resource tree of the NSCL after registration, that the device does not have SCL capability after registration, and determine, according to the position of the device in the resource tree of the NSCL before registration, that the device has SCL capability before registration, notify the device of setting a device SCL capability state of the device to be OFF, and delete a resource related to the device; or, determine, according to the position of the device in the resource tree of the NSCL after registration, that the device has SCL capability after registration, and determine, according to the position of the device in the resource tree of the NSCL before registration, that the device does not have SCL capability before registration, notify the device of setting a device SCL capability state of the device to be ON, and add the resource related to the device in the resource tree of the NSCL.

A de-registration creation notifying unit 203, configured to determine, according to the position of the device in the resource tree of the NSCL after registration, a target gateway where the device is located after registration, and determine, according to the position of the device in the resource tree of the NSCL before registration, a source gateway where the device is located before registration, notify a source gateway SCL of the device of performing de-registration, so that the source gateway deletes the resource related to the device, and notify a target gateway SCL of the device of creating the resource related to the device according to relevant service data of the device.

Meanwhile, the M2M platform 20 further can includes the following units (not shown in the figure): a request receiving unit, configured to receive a resource accessing request sent by a network application server, where the resource accessing request includes information on the position of the device in the resource tree of the NSCL before registration; an inquiring unit, configured to inquire mapping relationship of the device according to the resource accessing request; a redirecting unit, configured to send a redirection message to the network application server according to the inquired position of the device in the resource tree of the NSCL after registration corresponding to the position of the device in the resource tree of the NSCL before registration, so that the network application server accesses the M2M platform according to the information on the position of the device in the resource tree of the NSCL after registration.

Figure 14:
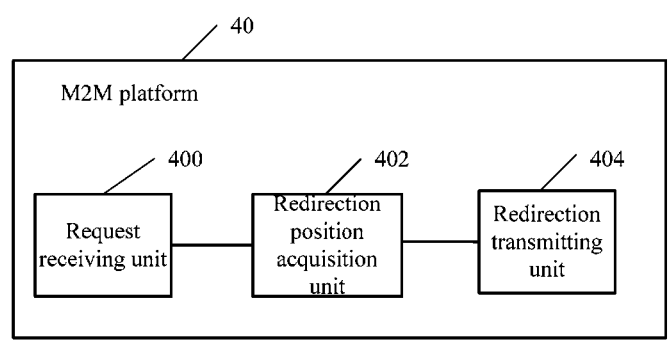
FIG. 14 is a schematic diagram of another specific construction of the M2M platform according to an embodiment of the present invention.

Or, FIG. 14 is a schematic diagram of another construction of an M2M platform according to an embodiment of the present invention. The M2M platform 40 includes: a request receiving unit 400, configured to receive a resource accessing request of the network application server, where the resource accessing request includes information on the position of the device in the resource tree of the NSCL; a redirection position acquisition unit 402, configured to, according to the stored mapping relationship of the device, determine that the position of the device in the resource tree of the NSCL is a position of the device in the resource tree of the NSCL before registration and acquire a position of the device in the resource tree of the NSCL after registration corresponding to the position of the device in the resource tree of the NSCL before registration; and a redirection sending unit 404, configured to send a redirection message to the network application server, so that the network application server can access the M2M platform according to the information on the position of the device in the resource tree of the NSCL after registration.

The M2M platform 40 further includes: a message acquisition unit, configured to receive a re-registration message including the position of the device in the resource tree of the network service capability layer NSCL before registration and the position of the device in the resource tree of the NSCL after registration; a mapping relationship generation unit, configured to generate mapping relationship between the position of the device in the resource tree of the NSCL before registration and the position of the device in the resource tree of the NSCL after registration.

Or, the M2M platform 40 further includes: a state-switch notifying unit, configured to determine, according to the position of the device in the resource tree of the NSCL after registration, that the device does not have SCL capability after registration, and determine, according to the position of the device in the resource tree of the NSCL before registration, that the device has SCL capability before registration, notify the device of setting an SCL capability state of the device to be OFF, and delete the resource related to the device; or, determine, according to the position of the device in the resource tree of the NSCL after registration, that the device has SCL capability after registration, and determine, according to the position of the device in the resource tree of the NSCL before registration, that the device does not have SCL capability before registration, notify the device of setting the SCL capability state of the device to be ON, and add the resource related to the device in the resource tree of the NSCL.

Or, the M2M platform 40 further includes: a de-registration creation notifying unit, configured to determine, according to the position of the device in the resource tree of the NSCL after registration, a target gateway where the device is located after registration, and determine, according to the position of the device in the resource tree of the NSCL before registration, a source gateway where the device is located before registration, notify a source gateway SCL of the device of performing de-registration, so that the source gateway deletes the resource related to the device, and notify a target gateway SCL of the device of creating the resource related to the device according to relevant service data of the device.

Figure 15:
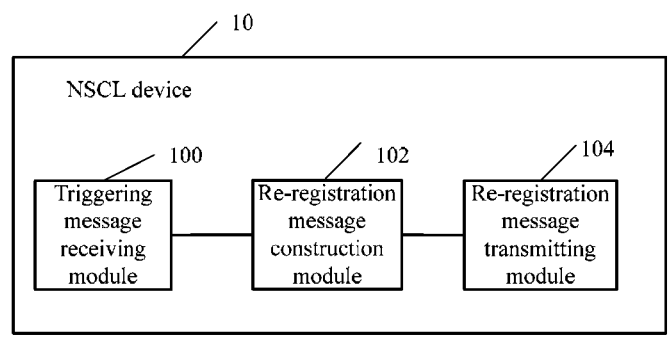
FIG. 15 is a schematic diagram of a specific construction of an NSCL device according to an embodiment of the present invention.

FIG. 15 is a schematic diagram of a specific construction of an NSCL device 10 according to an embodiment of the present invention. The device 10 includes:

a triggering message receiving module 100, configured to receive a device triggering message sent by a device in an M2M system, where the device triggering message includes an identity of the device and an identity of an NSCL which the device belongs to before registration;

a re-registration message construction module 102, configured to construct, according to the device triggering message, a re-registration message, where the re-registration message includes a position of a device in a resource tree of an NSCL before registration and a position of the device in the resource tree of the NSCL after registration;

a re-registration message sending module 104, configured to send the re-registration message to an M2M platform, so that the M2M platform generates mapping relationship between the position of the device in the resource tree of the NSCL before registration and the position of the device in the resource tree of the NSCL after registration.

Particularly, the device triggering message further includes a network address of the device after registration, and the re-registration message further includes the network address of the device after registration, so that the M2M platform updates a network address of the device in a DNS server according to the network address of the device after registration in the re-registration message.

The NSCL device is a device SCL (DSCL) located in the device or a gateway SCL (GSCL) located in a gateway connected to the device.

When the NSCL device is the device SCL, the NSCL device 10 further includes: a device resource processing module, configured to receive an OFF notification sent by the M2M platform, set a device SCL capability state of the device to be OFF according to the OFF notification, and delete the resource related to the device; or, receive an ON notification sent by the M2M platform, and set the device SCL capability state of the device to be ON, and add the resource related to the device in the resource tree of the NSCL.

When the NSCL device is the gateway SCL, the NSCL device 10 further includes: a gateway resource processing module, configured to receive a de-registration notification sent by the M2M platform, perform de-registration to a source gateway SCL according to the de-registration notification, so that the source gateway can delete the resource related to the device; or, receive a creation notification sent by the M2M platform, and create the resource related to the device according to the creation notification.

Terms and specific functions in the above apparatus and system embodiments are consistent with the previous method embodiments, and the details will not be repeated herein.

When the embodiments of the present invention are implemented, by carrying relevant information in a re-registration message, the M2M platform can update the position of the device in the resource tree of the NSCL according to the information in the re-registration message and establish corresponding relationship between the positions of the device in the resource tree of the NSCL before and after updating, the network application can, according to the corresponding relationship, use the position location before updating to access normally, and thus normal services of the user will not be interrupted for changing of network addresses.

Persons skilled in the art can understand that all or part of the processes in the method provided in the embodiments above may be implemented by a computer program instructing relevant hardware. The program may be stored in a computer-readable storage medium, and when the program is executed, the processes in the method according to the above embodiments are performed. Particularly, the storage medium may be a floppy disk, an optical disk, read-only memory (Read-Only Memory, ROM) or random access memory (Random Access Memory, RAM) or the like.

The above merely describes preferred embodiments of the present invention, and does not intend to limit the scope of the claims of the present invention. Therefore, equivalent variations made according to the claims of the present invention still fall within the scope of the present invention.

What is claimed is:

1. A method for switching of a device, comprising:
    receiving, by a machine-to-machine (M2M) platform, a re-registration message, wherein the re-registration message comprises a position of the device in a resource tree of a network service capability layer (NSCL) before registration and a position of the device in the resource tree of the NSCL after registration; and
    generating, by the M2M platform, a mapping relationship between the position of the device in the resource tree of the NSCL before registration and the position of the device in the resource tree of the NSCL after registration.

2. The method according to claim 1, wherein the re-registration message further comprises a network address of the device after registration, the method further comprising:
    updating, by the M2M platform, according to the network address of the device after registration in the re-registration message, a network address of the device in a domain name system (DNS) server, so that a network application server makes a request to the DNS server to receive the network address of the device after registration; and
    accessing, by the network application server, the device according to the received network address of the device after registration.

3. The method according to claim 1, wherein, before receiving, by the M2M platform, the re-registration message, the method further comprises:
    receiving, by a gateway service capability layer (GSCL), a device triggering message sent by the device, wherein the device triggering message comprises an identity of the device and an identity of an NSCL to which the device belongs before registration; and
    constructing, by the GSCL, the re-registration message according to the device triggering message, and sending the re-registration message to the M2M platform.

4. The method according to claim 1, wherein the method further comprises:
    determining, by the M2M platform, according to the position of the device in the resource tree of the NSCL after registration, that the device does not have service capability layer (SCL) capability after registration, and determining, according to the position of the device in the resource tree of the NSCL before registration, that the device has the SCL capability before registration, notifying the device of setting an SCL capability state of the device to be OFF, and deleting a resource related to the device; or
    determining, by the M2M platform, according to the position of the device in the resource tree of the NSCL after registration, that the device has the SCL capability after registration, and determining, according to the position of the device in the resource tree of the NSCL before registration, that the device does not have the SCL capability before registration, notifying the device of setting the SCL capability state of the device to be ON, and adding the resource related to the device in the resource tree of the NSCL.

5. The method according to claim 1, wherein the method further comprises:

determining, by the M2M platform, according to the position of the device in the resource tree of the NSCL after registration, a target gateway where the device is located after registration, and determining, according to the position of the device in the resource tree of the NSCL before registration, a source gateway where the device is located before registration, notifying a source gateway service capability layer (SCL) of the device of performing de-registration, so that the source gateway SCL can delete a resource related to the device; and notifying, by the M2M platform, a target gateway SCL of the device of creating the resource related to the device according to service data of the device.

6. The method according to claim 1, wherein the method further comprises:

receiving, by the M2M platform, a resource accessing request sent by a network application server, wherein the resource accessing request comprises information on the position of the device in the resource tree of the NSCL before registration; and inquiring, by the M2M platform, the mapping relationship to obtain the position of the device in the resource tree of the NSCL after registration corresponding to the position of the device in the resource tree of the NSCL before registration, and sending a redirection message to the network application server, so that the network application server accesses the M2M platform according to information on the position of the device in the resource tree of the NSCL after registration.

7. The method according to claim 1, wherein the device triggering message further comprises a network address of the device after registration.

8. A method for switching of a device, comprising:

receiving, by a gateway service capability layer (GSCL) module, a device triggering message sent by a device in a machine-to-machine (M2M) system, wherein the device triggering message comprises an identity of the device and an identity of a network service capability layer (NSCL) to which the device belongs before registration; and constructing, by the GSCL module, a re-registration message according to the device triggering message, and sending the re-registration message to an M2M platform, wherein the re-registration message comprises a position of the device in a resource tree of the NSCL before registration and a position of the device in the resource tree of the NSCL after registration, so that the M2M platform generates a mapping relationship between the position of the device in the resource tree of the NSCL before registration and the position of the device in the resource tree of the NSCL after registration.

9. The method according to claim 8, wherein the device triggering message further comprises a network address of the device after registration, and the re-registration message further comprises the network address of the device after registration, so that the M2M platform updates the network address of the device in a domain name system (DNS) server according to the network address of the device after registration in the re-registration message.

10. The method according to claim 8, further comprising:

when the M2M platform determines, according to the position of the device in the resource tree of the NSCL after registration, that the device does not have service capability layer (SCL) capability after registration, and determines, according to the position of the device in the resource tree of the NSCL before registration, that the device has the SCL capability before registration, receiving, by the NSCL module, an OFF notification sent by the M2M platform, setting a device SCL capability state of the device to be OFF according to the OFF notification, and deleting a resource related to the device; or when the M2M platform determines, according to the position of the device in the resource tree of the NSCL after registration, that the device has the SCL capability after registration, and determines, according to the position of the device in the resource tree of the NSCL before registration, that the device does not have the SCL capability before registration, receiving, by the device, an ON notification sent by the M2M platform, and setting the device SCL capability state of the device to be ON according to the ON notification.

11. The method according to claim 8, further comprising:

when the M2M platform determines, according to the position of the device in the resource tree of the NSCL after registration, a target gateway where the device is located after registration, and determines, according to the position of the device in the resource tree of the NSCL before registration, a source gateway where the device is located before registration, receiving, by a gateway service capability layer (SCL) on the source gateway, a de-registration notification sent by the M2M platform and performing de-registration to a source gateway SCL according to the de-registration notification, so that the source gateway SCL deletes a resource related to the device; and receiving, by a gateway SCL on the target gateway, a creation notification sent by the M2M platform, and creating the resource related to the device according to the creation notification.

12. A method for accessing a resource, comprising:

receiving, by a machine-to-machine (M2M) platform, a resource accessing request of a network application server, wherein the resource accessing request comprises information on a position of a device in a resource tree of a network service capability layer (NSCL);

according to a mapping relationship of the device in the M2M platform, determining that the position of the device in the resource tree of the NSCL is a position of the device in the resource tree of the NSCL before registration and acquiring a position of the device in the resource tree of the NSCL after registration corresponding to the position of the device in the resource tree of the NSCL before registration; and sending a redirection message to the network application server, so that the network application server accesses the M2M platform according to information on the position of the device in the resource tree of the NSCL after registration.

13. The method according to claim 12, further comprising:

receiving, by the M2M platform, a re-registration message, wherein the re-registration message comprises the position of the device in the resource tree of the NSCL before registration and the position of the device in the resource tree of the NSCL after registration; and generating, by the M2M platform, the mapping relationship between the position of the device in the resource tree of the NSCL before registration and the position of the device in the resource tree of the NSCL after registration.

14. The method according to claim 13, further comprising:
determining, by the M2M platform, according to the position of the device in the resource tree of the NSCL after registration, that the device does not have service capability layer (SCL) capability after registration, and determining, according to the position of the device in the resource tree of the NSCL before registration, that the device has the SCL capability before registration, notifying the device of setting a SCL capability state of the device to be OFF, and deleting a resource related to the device; or
determining, by the M2M platform, according to the position of the device in the resource tree of the NSCL after registration, that the device has the SCL capability after registration, and determining, according to the position of the device in the resource tree of the NSCL before registration, that the device does not have the SCL capability before registration, notifying the device of setting the SCL capability state of the device to be ON, and adding the resource related to the device in the resource tree of the NSCL.

15. The method according to claim 13, further comprising:
determining, by the M2M platform, according to the position of the device in the resource tree of the NSCL after registration, a target gateway where the device is located after registration, and determining, according to the position of the device in the resource tree of the NSCL before registration, a source gateway where the device is located before registration, notifying a source gateway service capability layer (SCL) of the device of performing de-registration, so that the source gateway deletes a resource related to the device; and
notifying, by the M2M platform, a target gateway SCL of the device of creating the resource related to the device according to relevant service data of the device.

16. A machine-to-machine (M2M) platform, comprising:
a non-transitory processor-readable medium storing program codes; and
a processor executing the program codes stored in the non-transitory processor-readable medium to configure the M2M platform to:
receive a re-registration message, wherein the re-registration message comprises a position of a device in a resource tree of a network service capability layer (NSCL) before registration and a position of the device in the resource tree of the NSCL after registration; and
generate a mapping relationship between the position of the device in the resource tree of the NSCL before registration and the position of the device in the resource tree of the NSCL after registration.

17. The M2M platform according to claim 16, wherein the re-registration message further comprises a network address of the device after registration, and the M2M platform is further configured to update, according to the network address of the device after registration in the re-registration message, a network address of the device in a domain name system (DNS) server, so that a network application server makes a request to the DNS server to receive the network address of the device after registration.

18. The M2M platform according to claim 16, wherein the M2M platform is further configured to:
determine, according to the position of the device in the resource tree of the NSCL after registration, that the device does not have service capability layer (SCL) capability after registration, and determine, according to the position of the device in the resource tree of the NSCL before registration, that the device has the SCL capability before registration, notify the device of setting a device SCL capability state of the device to be OFF, and delete a resource related to the device; or
determine, according to the position of the device in the resource tree of the NSCL after registration, that the device has the SCL capability after registration, and determine, according to the position of the device in the resource tree of the NSCL before registration, that the device does not have the SCL capability before registration, notify the device of setting the device SCL capability state of the device to be ON, and add the resource related to the device in the resource tree of the NSCL.

19. The M2M platform according to claim 16, wherein the M2M platform is further configured to:
determine, according to the position of the device in the resource tree of the NSCL after registration, a target gateway where the device is located after registration, and determine, according to the position of the device in the resource tree of the NSCL before registration, a source gateway where the device is located before registration, notify a source gateway service capability layer (SCL) of the device of performing de-registration, so that the source gateway SCL deletes a resource related to the device, and notify a target gateway SCL of the device of creating the resource related to the device according to relevant service data of the device.

20. The M2M platform according to claim 16, wherein the M2M platform is further configured to:
receive a resource accessing request sent by a network application server, wherein the resource accessing request comprises information on the position of the device in the resource tree of the NSCL before registration;
inquire the mapping relationship of the device according to the resource accessing request; and
send a redirection message to the network application server according to the inquired position of the device in the resource tree of the NSCL after registration corresponding to the position of the device in the resource tree of the NSCL before registration, so that the network application server accesses the M2M platform according to information on the position of the device in the resource tree of the NSCL after registration.

21. A machine-to-machine (M2M) platform, comprising:
a non-transitory processor-readable medium storing program codes; and
a processor executing the program codes stored in the non-transitory processor-readable medium to configure the M2M platform to:
receive a resource accessing request of a network application server, wherein the resource accessing request comprises information on a position of a device in a resource tree of a network service capability layer (NSCL);
determine, according to a stored mapping relationship of the device, that the position of the device in the resource tree of the NSCL is a position of the device in the resource tree of the NSCL before registration and acquire a position of the device in the resource tree of the NSCL after registration corresponding to the position of the device in the resource tree of the NSCL before registration; and send a redirection message to the network application server, so that the network application server accesses the M2M platform according to information on the position of the device in the resource tree of the NSCL after registration.

\* \* \* \* \*